united States Patent Office 3,315,222
Patented Apr. 18, 1967

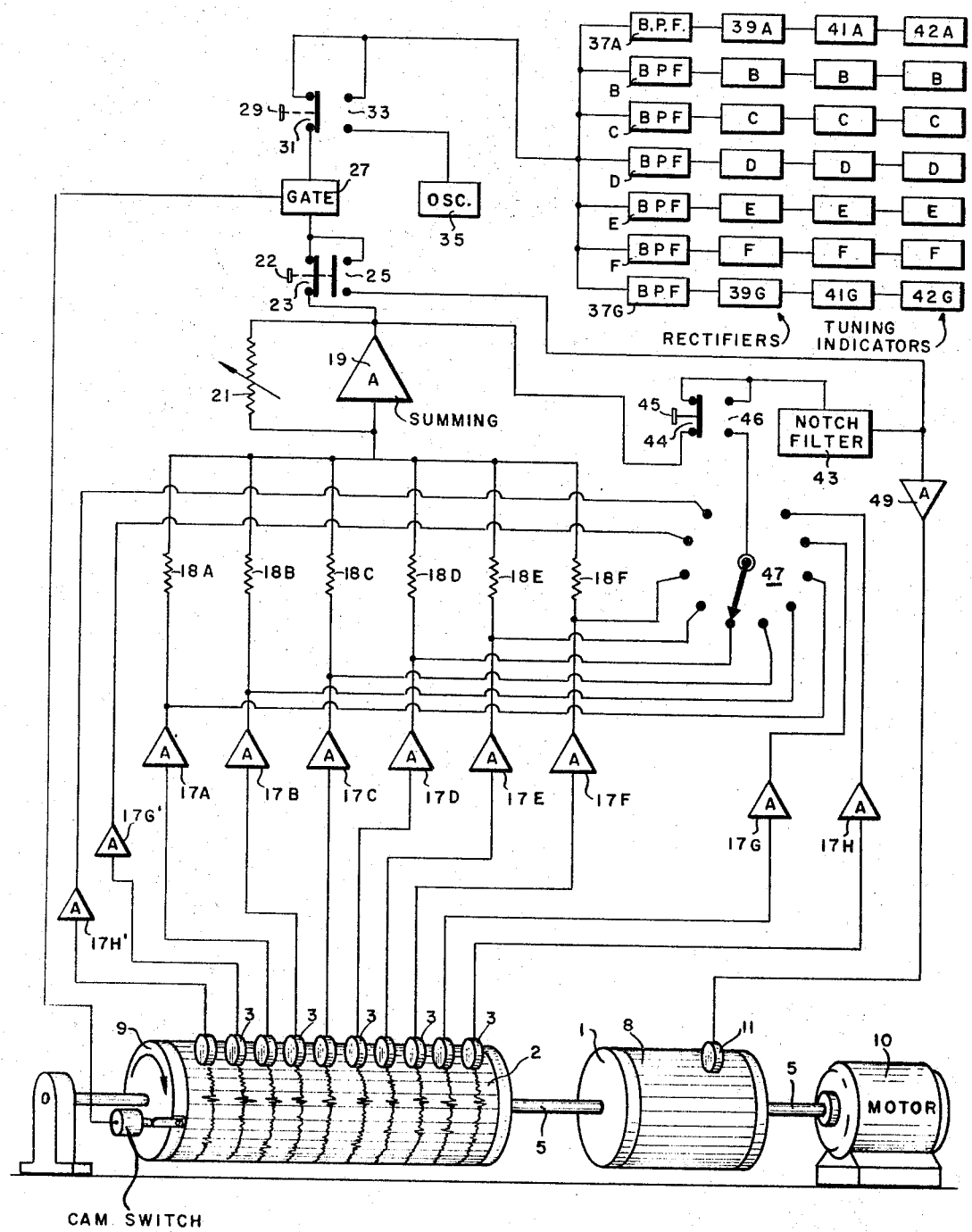

3,315,222
ELIMINATION OF UNDESIRED COMPONENTS OF SEISMOGRAMS
Charles W. Bogs, Houston, Tex., assignor to Esso Production Research Company, a corporation of Delaware
Filed Apr. 12, 1965, Ser. No. 447,230
3 Claims. (Cl. 340—15.5)

ABSTRACT OF THE DISCLOSURE

An undesired, high amplitude component of a seismogram is determined and eliminated by reproducing the seismogram traces as a single electrical signal, applying the signal through a notch-elimination filter to a bank of sharply tuned, narrow band pass filters of different adjacent pass bands, measuring the amplitudes of the output signals and varying the frequency of the notch filter until the highest amplitude output signal from the band pass filters is eliminated. The traces of the seismogram are then individually reproduced and applied to a recorder through the notch filter.

---

This invention relates generally to the art of seismic prospecting, and more particularly to the determination of the frequency of undesired components on the traces of a seismogram and the removal from the seismogram of such undesired components.

The general method of geophysical exploration utilizing seismic waves in the earth is well known. Briefly stated, this method comprises the steps of initiating a seismic disturbance at or near the surface of the earth, and recording signals generated by geophones as a result of the earth's movement at one or more points more or less spaced from the point of origin of the disturbance. The recordation must permit measurement of the time elapsing between the instant of the origination of the disturbance and the generation of signals as the result of the subsequent earth movement. The original disturbance will set up elastic waves that are transmitted through the earth. Any discontinuity or variations of structure within the earth will reflect and/or refract a portion of the energy in the waves so that a record of the signals from the receiving points will comprise a number of arriving waves, each derived from the original disturbance and each differing from the others in time of arrival, magnitude, wave shape, or all three.

The traces of some seismograms have been found to contain high amplitude events in a narrow band of frequencies, which events may completely mask the useful seismic data. Such events, usually termed "ringing events," most often are found on seismograms obtained by seismic exploration in water covered areas. Various field techniques have been developed for combating this phenomenon, but none have been completely successful in eliminating the events from seismograms. The problem is discussed in the article "Water Reverberations—Their Nature and Elimination," by M. M. Backus, in Geophysics, vol. XXIV, pp. 233–261.

In accordance with the teachings of the present invention, a seismogram may be formed in accordance with prior art teachings. The traces of the seismogram are reproduced as a plurality of electrical signals. One or more of these signals is fed to an electrical channel containing a gating device operative to gate the electrical signal therein so as to eliminate "first arrival" events. The gated signal is fed to a multiplicity of electrical channels, each containing a band pass filter and means for producing an output indication of the strength of the components of the signals passed by the band pass filter therein over a period of time. The pass bands of the band pass filters are contiguous and very narrow. Adjustable frequency notch filter means is also provided along with means for recording the output signal thereof as a record trace. Switching means are provided connected to electrical channels wherein the electrical signals of the reproduced seismogram traces are individually fed, the switching means being adapted to individually connect the reproduced seismogram traces to the notch filter means. The notch filter means is selectively connectable either between the switching means and the means for recording the output signal of the notch filter means or ahead of the gating means in the electrical channel into which one or more of the reproduced seismogram traces are fed.

One or more of the seismogram output signals are reproduced to eliminate components thereof corresponding to first arrival events, gated, and thereafter applied to the band pass filters and indicating devices to determine the frequency component responsible for events that mask useful seismic information in the seismogram. The notch filter can thereupon be inserted in the circuit ahead of the gating means and adjusted to eliminate signals in the undesired frequency band. The seismogram is thereupon repetitively reproduced, and the reproduced traces thereof are sequentially rerecorded after being passed through the notch filter so that in the resulting seismogram the undesired events are eliminated.

Objects and features of the invention which are not apparent from the above discussion will become evident upon consideration of the following detailed description of the invention taken in connection with the accompanying drawing wherein the single figure illustrates a preferred embodiment of the invention.

With reference now to the figure, there is shown a pair of recording medium transport means 1 and 9 driven from a common shaft by an electrical motor 10. Also connected to the shaft is a cam-operated switch 15 which is set to close at a predetermined time after the break time on the seismic record for purposes that will become evident below. Transport means 1 and 9 respectively carry recording media 2 and 8, which may be magnetic tapes such as are conventionally used in the art. Alternatively, the recording media may assume other conventional forms such as electrosensitive paper, photographic film, and the like. A plurality of appropriately designed reproducing heads 3 are disposed adjacent the transport means 1 so as to reproduce as electrical signals the traces previously recorded on the recording medium 2. While only ten reproducing heads 3 are illustrated to avoid unduly cluttering the drawing, it is to be understood that many more, such as 12 or 24, may be utilized as needed. A predetermined number of the recording heads are connected to a summing amplifier comprising summing resistors 18A, 18B, 18C, . . . 18F, and an adjustable gain amplifier 19 having a variable resistance 21 for the purpose of adjusting the gain thereof. The reproducing heads 3 are coupled to the summing amplifier through a bank of seismic amplifiers designated by the reference numerals 17A through 17F. Preferably, at least six of the reproducing heads 3 are coupled to the summing amplifier. It will be found that a plurality of seismic traces will give a more accurate indication of the "ringing frequency" since this "ring" will be present on all the traces of the same shot. Traces from three geophones on each side of the shot point may be advantageously used since these are least affected by move-out, and the move-out corrector will cause very little change of frequency in these traces. Thus, the ringing events will be reproduced concurrently and will reinforce each other when the events are added together. Under favorable circumstances, as few as one recording head may be utilized.

The output of the summing amplifier 19 is coupled to a gating device 27 through the contacts 23 of switch 22. The gating device 27 may be a relay or an electronic gate, as desired. The gate is actuated by an electrical signal from the cam-actuated switch 15.

The output signal of gating device 27 is coupled through contacts 31 of switch 29 to the input circuits of each of a plurality of band pass filters 37A, 37B, . . . 37G. While seven filters are illustrated, a different number may be used. The pass bands of the band pass filters are contiguous and, taken together, cover at least a portion of the seismic spectrum, preferably that portion within which the undesired events are most likely to occur. Preferably, the pass band of each filter should be about one cycle in width such that at a frequency one cycle removed from the center frequency, the amplification level is reduced to half or less the amplification level at the center of the pass band. The output circuit of each band pass filter is connected to apparatus for producing an output indication of the total amplitude of the output signal of the band pass filter over an extended period of time. Each of the indicating apparatuses is identical, and in the case of the band pass filter 37A, may comprise a tandem-connected full-wave rectifier 39A, an integrating circuit 41A, and a voltage responsive indicating device 42A. Preferably, the time constant of the integrator is adjustable so that it can function also as an averaging circuit or short-time integrator. The voltage amplitude indicating devices 42A through 42G preferably are electron-ray tubes, such as types 6FG6 and 6HU6, which are designed to indicate visually by means of a fluorescent target the effects of a change in controlling voltage. However, a voltmeter preceded by an isolating amplifier can also be used. As has been mentioned above, each of the frequency measuring channels contains identically designed components with the exception of the filters, and the only difference in the design of the various filters is to produce contiguous pass bands within a preselected frequency range.

Also connected to the input circuits of each of the filters is a variable frequency calibrated standard oscillator, which is connected to the filters through the contacts 33 of switch 29. Switch 29 is designed so that either the output signal of gate 27 or the output signal of oscillator 35 are connected to the input circuits of the various filters 37A through 37G.

The output circuits of the seismic amplifiers 17A through 17H are individually connected to the input circuit of notch filter means 43 through a multiposition switch 47 and a single pole, double throw switch 45. The output circuit of the notch filter 43 is connected to recording head 11 through amplifier 49. Recording head 11 is positioned adjacent the recording drum 9 and is adjustable parallel to the longitudinal axis thereof so as to record the output signals of reproducing heads 3 in the order of the position of the reproducing heads 3 on recording medium 8. The notch filter 3 may be of the parallel-T, resistance-capacitance network type and has a rejection band width substantially the same as the width of the pass band of one of the band pass filters. One or more notch filters may be used. When a plurality of notch filters are available, they are connected in tandem to increase the depth of the notch by adjusting them to the same rejection frequency, or to increase the sharpness of the filters by adjusting them to different frequencies. The notch or rejection frequency of the filter is adjustable over the range covered by the band pass filters. Notch filters of the type mentioned above are described in the "Proceedings of the I.R.E.," December 1952, pp. 1715 and 1716.

Switch 22, which may be of the double pole, double throw type, is for the purpose of selectively connecting either the output of summing amplifier 19 or the output of notch filter 43 to the input of gate 27. In one position of the switch, contacts 25 are closed to connect notch filter 43 to gate 27, and in the other position thereof, contacts 23 are closed to connect the output of amplifier 19 to the input of gate 27. The output of amplifier 19 is also connected to the input of notch filter 43 through switch 45, and with contacts 25 closed, notch filter 43 removes certain frequency components from the output signal of amplifier 19 for application to the band pass filters 37A through 37G through gate 27. The band pass filters and indicating devices are calibrated with an oscillator, the frequency of which is switch-selected to permit ease of repeatability. Each of the indicator tubes can be labeled with its frequency (as determined by the band pass filter to which it is connected) and the dial setting of the notch filters. The notch filters also are calibrated with the same standard oscillator.

Initially, contact 33 of switch 29 is closed so that band pass filters 37A and tuning indicators 42A may be calibrated. Each of the band pass filters 37A through 37G is adjusted so that at one cycle on either side of its center frequency the amplitude is down to approximately one-half the level at the center frequency. Then, with contacts 44 of switch 45 closed, and contacts 23 and 31 closed, motor 10 is activated so that the traces on recording medium 3 are reproduced as electrical signals one or more times. The output signals of amplifiers 17A through 17F are summed in the summing amplifier and are applied to gate 27. Gate 27, however, is not opened until after the first arrival events of the seismogram are reproduced. Thereafter, the summed signal is applied to the band pass filters 37A through 37G. If there is a high amplitude component of a particular frequency in the seismogram traces, this will be evident by one of the tuning indicators 42A through 42G becoming almost closed at the end of the reproducing cycle when gate 27 is again opened. Notch filter 43 is adjusted to eliminate this particular frequency. Contacts 25 of switch 22 are closed, and the traces of the seismogram are again reproduced. If the notch filter 43 has been adjusted to the correct frequency, the tuning indicator that previously indicated a maximum signal, will indicate zero signal. If the notch filter 43 is not eliminating components of the seismogram of the appropriate frequency, it may be re-adjusted and the procedure repeated until the appropriate one of tuning indicators 42A through 42G indicates that seismogram components of the appropriate frequency are being eliminated by the notch filter. Contacts 46 of switch 45 are then closed and contacts 25 opened. The wiper arm of switch 47 is moved to one of the extreme contacts thereof (for example, the contacts connected either to amplifiers 17H or 17H', and recording head 11 is adjusted to record at or near one end of recording medium 8). The traces of the seismogram on recording medium 3 are successively reproduced and recorded, the recording head 11 being moved after each reproducing cycle and the wiper arm of switch 27 being successively readjusted until all of the traces of the seismogram on recording medium 3 have been re-recorded on recording medium 8, with the undesired frequency components thereof being eliminated by notch filter 43.

Manifestly, unless the first arrival events were eliminated, these events would produce indications on one or more of indicators 42A . . . 42G that could be of greater amplitude than the indications produced by the ringing events. By gating the reproduced trace signals as described, possible confusing indications from this source are eliminated. The gate may be adjusted to pass signals for any period of time, but is usually adjusted to include only the geologic time section of interest. For example, this may be from about .4 second to about 3 seconds on the time axis of the reproduced seismogram.

The invention is not to be restricted to the specific structural details, arrangement of parts, or circuit connections herein set forth, as various modifications thereof may be effected without departing from the spirit and scope of the invention.

What is claimed is:

1. Apparatus for use in analyzing seismograms known to have strong, undesired components of unknown frequency, comprising:

first means for reproducing at least one of the traces of said seismogram in a first electrical output channel thereof as a single electrical signal, and for reproducing all of the traces of said seismogram as individual electrical signals in a plurality of second electrical output channels thereof;

gating means in the first electrical output channel of said first means for gating a predetermined portion of the signal appearing in said first electrical output channel;

a plurality of third electrical channels including a plurality of band pass filters having contiguous pass bands, each connected at its input to the output of said gating means, said filters being operative to produce in said plurality of third electrical channels a plurality of electrical signals, the amplitudes of which are proportional to the amplitudes of the frequency components of the output signal of said gating means included within the pass band thereof;

a plurality of full-wave rectifier means respectively connected to said band pass filters;

a plurality of integrating circuit means respectively connected to the outputs of said rectifier means;

a plurality of direct voltage responsive indicator means respectively connected to said integrating circuit means for respectively producing a visual indication of the output signals of said integrating circuit means;

variable-frequency notch filter means;

switching means connected to said second electrical output channels of said first means for individually connecting the signals appearing in said second output channels to said notch filter means;

second means for recording the output signals of said notch filter means as a plurality of traces; and means for selectively connecting said notch filter means between said switching means and said second means, and between the first output circuit of said first means and said gating means.

2. Apparatus for use with multitrace seismograms known to have strong electrical components of unknown frequency, comprising:

first means for reproducing a plurality of traces of said seismogram as electrical signals;

variable gain summing means connected to said first means for summing said electrical signals;

gating means connected to said first means and said variable gain means for gating the output signal of said variable gain means over a predetermined portion of the reproducing cycle of said first means;

a plurality of band pass filters having contiguous pass bands, each connected at its input to the output of said gating means, operative to produce in a plurality of electrical channels a plurality of electrical signals, the amplitudes of which are proportional to the frequency components of the output signal of said gating means;

means connected to each of said band pass filters for producing an output indication of the strength of the signal components of the signals passed by said each band pass filter over a period of time;

notch filter means;

switching means connected to the output channel of said variable gain summing means for individually connecting the output signals of said first means to said notch filter means;

presentation means for recording the output signal of said notch filter means; and means for selectively connecting said notch filter means between said switching means and said presentation means, and between said summing means and said gating means.

3. Apparatus for use with multitrace seismograms known to have strong electrical components of unknown frequency, comprising:

first means for reproducing a plurality of traces of said seismogram as electrical signals;

variable gain summing means connected to said first means for summing said electrical signals;

gating means connected to said first means and said variable gain means for gating the output signal of said variable gain means over a predetermined portion of the reproducing cycle of said first means;

a plurality of band pass filters having contiguous pass bands, each connected at its input to the output of said gating means, operative to produce in a plurality of electrical channels a plurality of electrical signals, the amplitudes of which are proportional to the frequency components of the output signal of said gating means;

a plurality of full-wave rectifier means respectively connected to said band pass filters;

a plurality of integrating circuit means respectively connected to the outputs of said filters;

a plurality of direct voltage responsive indicator means respectively connected to said integrating circuit means for respectively producing a visual indication of the output signals of said integrating circuit means;

notch filter means;

switching means connected to the output channel of said variable gain summing means for individually connecting the output signals of said first means to said notch filter means;

presentation means for recording the output signal of said notch filter means; and means for selectively connecting said notch filter means between said switching means and said presentation means, and between said summing means and said gating means.

References Cited by the Examiner
UNITED STATES PATENTS

| | | | |
|---|---|---|---|
| 3,121,856 | 2/1964 | Finney | 340—15.5 |
| 3,123,799 | 3/1964 | Shook | 340—15.5 |
| 3,167,710 | 1/1965 | Cox | 340—15.5 |
| 3,176,305 | 3/1965 | Webster | 340—15.5 |
| 3,221,297 | 11/1965 | Smith et al. | 340—15.5 |

BENJAMIN A. BORCHELT, *Primary Examiner.*

SAMUEL FEINBERG, *Examiner.*

R. M. SKOLNIK, *Assistant Examiner.*